April 28, 1953 G. DEAKIN 2,636,946
ALTERNATING CURRENT-DIRECT CURRENT PULSING
CIRCUITS FOR REGISTER SENDERS
Filed June 22, 1948 3 Sheets-Sheet 1
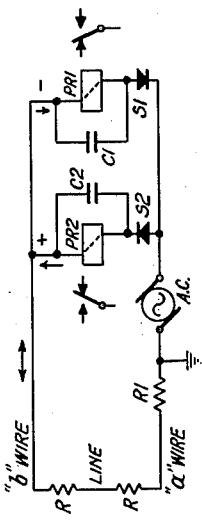
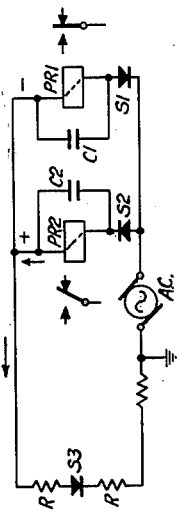
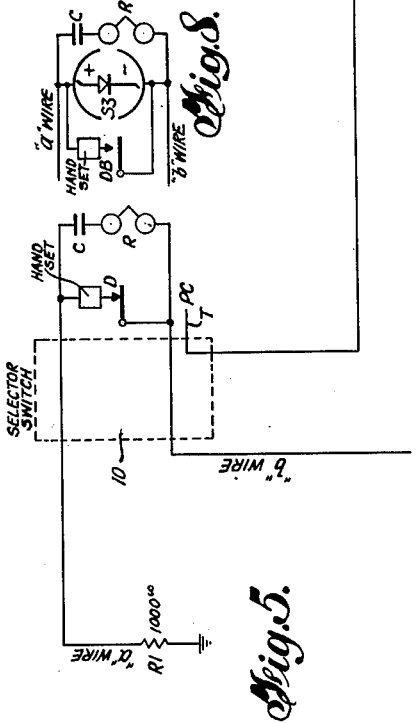
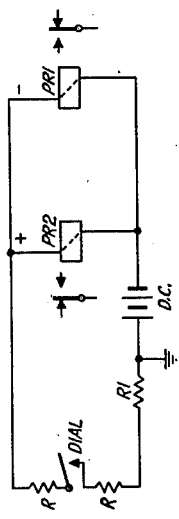
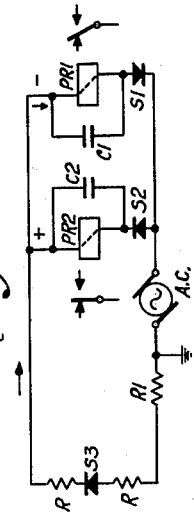
INVENTOR.
GERALD DEAKIN
BY
ATTORNEY Patented Apr. 28, 1953

2,636,946

UNITED STATES PATENT OFFICE 2,636,946

ALTERNATING CURRENT-DIRECT CURRENT PULSING CIRCUITS FOR REGISTER SENDERS

Gerald Deakin, New York, N. Y., assignor to International Standard Electric Corporation, New York, N. Y., a corporation of Delaware Application June 22, 1948, Serial No. 34,525

3 Claims. (Cl. 179—16)

This invention relates to new and useful improvements in automatic switching systems, such as are used in telephone exchanges, and more particularly in the pulsing circuits of such systems.

The object of the invention is to provide, in a register attached to a calling line in the manner shown in my prior patents, a simple and efficient means for counting and storing the impulses representing the digits of a number, the pulses being produced by one or the other of two types of pulse senders or controllers.

In the one case the pulse sender is the conventional calling dial which opens the line circuit to produce a pulse. This dial is adapted to produce one to ten pulses depending upon the movement of the finger wheel.

In the other case the pulse sender, instead of opening the line to produce a pulse, closes the line through a rectifier, thus limiting the flow of current in the line circuit to current of one polarity and then alternately reverses the polarity. This action provides for the operation and release of polarized relays located in the register and connected to a source of alternating current. The pulse sender or controller is adapted to produce a maximum of five pulses of alternate polarities. The ten digits are represented by two groups of pulses, the groups being distinguished one from the other by the polarity and duration of the starting or first pulse of the series. A rectifier sender of the above type has been disclosed in my Patent No. 2,433,347.

A feature of the invention is the ability of the register to recognize the polarity of the first or starting pulse and to adjust the pulse counting relays to register properly the pulses that follow.

The register is also provided with means for arranging its pulse receiving circuit to operate in connection with the type of controller or sender to be used for recording. The same groups of pulse counting relays are used for counting and recording the pulses produced by either type of sender.

The above-mentioned and other features and objects of this invention and the manner of attaining them will become more apparent and the invention will be best understood, by reference to the following description of an embodiment of the invention taken in conjunction with the accompanying drawings, wherein:

Fig. 1 is a diagram which illustrates the theory of dial pulsing with direct current and a circuit interrupter.

Figs. 2, 3 and 4 are diagrams which illustrate the theory of rectifier pulsing with alternating current.

Fig. 5 is a diagram showing the subscriber's line with the open circuit dial sender.

Figure 6:
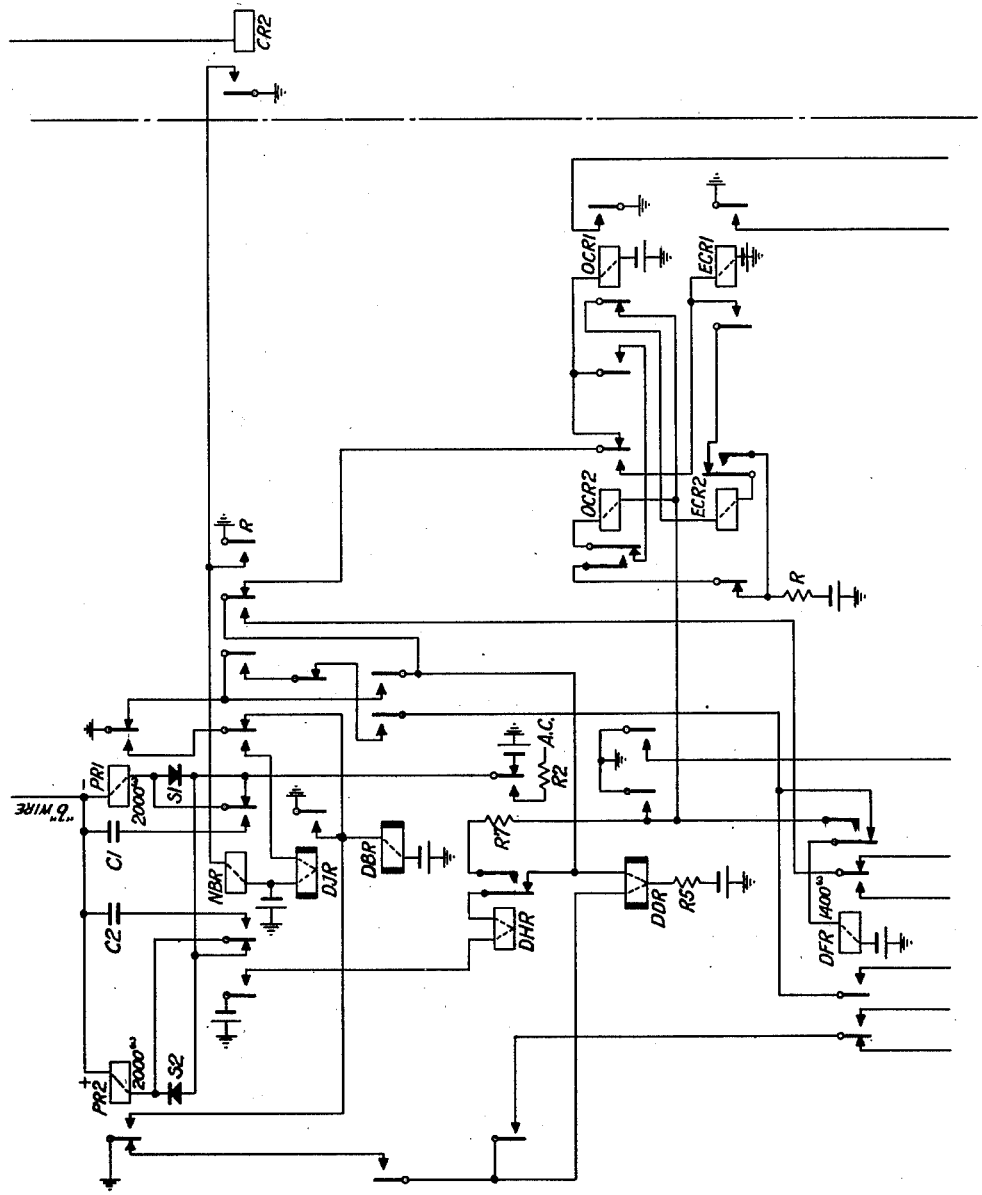

Fig. 6, which should be placed below Fig. 5, is a diagram of the pulse receiving circuit.

Figure 7:
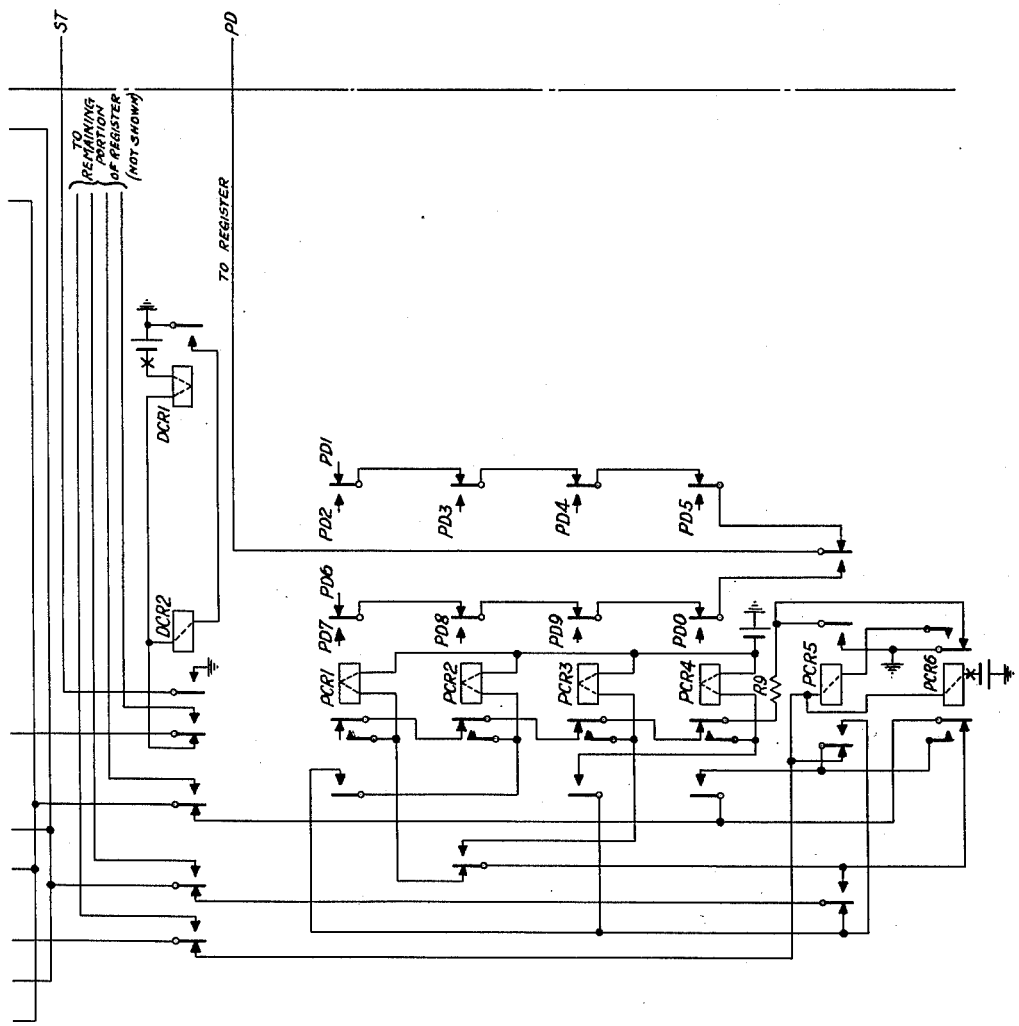

Fig. 7, which should be placed below Fig. 6, is a diagram of the pulse counting and storing circuit.

Fig. 8 is a diagram corresponding to Fig. 5 but showing a rectifier sender with the parts in the position to pass current of one polarity.

Fig. 9 is a diagram of the same rectifier sender with the parts in the position to pass current of the opposite polarity.

The circuits of Figs. 5 to 9 inclusive show only those circuit elements necessary for a complete understanding of the invention. The subscriber's station indicated in Fig. 5 has a sender of the open circuit pulsing type with the dial and ringer diagrammatically represented. It will be understood that a plurality of subscriber's stations are connected to the register shown in Figs. 6 and 7 by the conventional links indicated by the box 10 and shown more fully in my prior patents. Figs. 8 and 9 represent diagrammatically a rectifier sender in the two possible positions of the rectifier. A plurality of these subscriber's stations may also be connected to the link circuit 10 for selective connection to the system. The pulse receiving circuit of Fig. 6 and the pulse counting and storing circuit of Fig. 7, are parts of a register circuit which provides for multi-potential selection. For a more complete register circuit of this type reference may be made to my prior patents such as Patent 2,380,950, issued August 7, 1945.

GENERAL THEORY

The register circuit is adapted for open circuit pulsing and rectifier pulsing. By open circuit pulsing is meant the opening and closing of the line circuit for each pulse as with the dial now in use. By rectifier pulsing is meant the connection of a rectifier in the line circuit so as to permit the positive and negative components of the alternating current to pass alternately through the circuit. The source of alternating current may vary in frequency such as from 133 cycles to 400 cycles. The main exchange storage battery is used for open circuit dialling.

In the A-register circuit direct current is normally connected so that when a line is equipped for open circuit pulsing calls, no change is required. However, when a line is equipped for rectifier pulsing calls, the register circuit is arranged to automatically disconnect the source of direct current potential and connect the alternating current source at the start of the first pulse.

Definitions for positive and negative pulses in alternating current pulsing

In order to avoid confusion in understanding the following description, it is well to have definitely in mind what is meant by a "negative" pulse and what is meant by a "positive" pulse. The definitions used herein are arbitrary, but as the negative pole of the exchange battery is usually associated with the "b" wire, a current pulse which flows from the "a" wire to the "b" wire through the subscriber's set is herein considered a negative pulse. Consequently, a current pulse which flows from the "b" wire to the "a" wire through the subscriber's set is considered a positive pulse. Furthermore, the pulse counting circuit may be operated over the front contact of the pulsing relay or over the back contact. When it is operated over the front contact, the count is made at the beginning of a pulse; when it is operated over the back contact, the count is made at the end of a pulse.

Open circuit pulsing with direct current

When the line circuit is opened, as indicated in Fig. 1, both pulsing relays PR1 and PR2 fall off and make their back contacts.

Rectifier pulsing with alternating current

The theory of alternating current pulsing may be best understood by reference to Figs. 2, 3 and 4. The pulsing circuit comprises a source of alternating current, indicated at A. C., two low impedances, relatively high resistance, pulsing relays, PR1 and PR2, two rectifiers, S1 and S2, two capacitors, C1 and C2, and one resistor R1.

When the handset is removed and the line circuit closed, the circuit becomes as shown in Fig. 2. The positive pulsations operate relay PR2 and the current flows from one pole of the alternating current source through rectifier S2, winding PR2, in multiple with capacitor C2, line from the "b" to the "a" wire resistor R1 to the other pole of the alternating current source. The negative pulsations operate relay PR1 in a similar manner when current flows in the opposite direction. During the current reversals the relays remain on their front contacts because of the charged and bridged capacitors which tend to sustain the current after the pulsation ceases. For example, in the case of relay PR1, this temporary sustaining current flows from capacitor C1. The relays are very sensitive and will follow the alternating current frequency when capacitors are not connected.

When a rectifier sender is used, the alternating current during a given pulse becomes a pulsating current flowing in one direction only; that is, in the direction permitted by the polarization of the rectifier S3 at the subscriber's station. Rectifier S3 is shown polarized for a terminating negative pulse in Fig. 3. Relay PR1 is maintained on its front contact but relay PR2 releases and makes its back contact and counts the pulse.

When the polarization of the rectifier S3 is reversed, as shown in Fig. 4, for a terminating positive pulse, relay PR1 makes its back contact and counts the pulse while relay PR2 maintains its front contact.

For a given relay speed, rectifier pulsing, in theory, is four times as fast as open circuit pulsing for two reasons:

a. With open circuit pulsing a maximum of ten pulses is required and only one count is made per time interval and that is when the single pulsing relay makes it back contact. When the relay is on its front contact, the time is lost, so far as pulses are concerned.

b. With rectifier pulsing a maximum of only five pulses is required and two pulses are produced per time interval, one by each of two pulsing relays. During one half of the time interval one relay (—) makes its back contact and makes one count; during the other half of the time interval the other relay (+) makes its back contact and makes a second count. Thus two pulses are recorded in one time interval.

By cutting the time in half and by cutting the number of pulses in half, the theoretical speed is increased fourfold.

In actual practice, full advantage cannot be taken of this theoretical fourfold increase in speed because the changeover time from one digit to the next is approximately one-half instead of one-fourth. Taking all things into consideration, rectifier dialling in actual practice increases the speed of sending two to three times, depending upon the digit.

SUBSCRIBER'S STATION DIAL OR SENDER

Open circuit dial

The open circuit dial is the ordinary dial now in general use.

Rectifier sender

A rectifier sender may be of many designs making use of the principles disclosed in my above-mentioned Patent No. 2,433,347. It should be capable of generating two series of five pulses alternately positive and negative, one series to start with a short positive pulse following negative current flow produced as the sender is set and the other with a long positive pulse which is a combination of positive current flow produced as the sender is set and the first positive pulse.

In order to accomplish this, the rectifier sender is provided with a direct current bridge or short circuiting connection which remains bridging the rectifier during most of the time the lever is moving towards the finger stop. In the case of digit from 1 to 5, for instance, the direct current bridge is connected until the finger stop is reached, whereupon the rectifier is in position to permit a negative pulse. In the case of digits from 6 to 0, the direct current bridge is connected until the lever has moved part way through the first, or number 6, position, whereupon the rectifier is connected so as to permit a positive pulse and it remains so connected in the finger stop position.

The order, polarity and number of pulses for which the register circuit of Figs. 6 and 7 is designed are shown in Tables I and II. In these tables the potentials corresponding to the successive positions through which the lever moves in sending a particular digit are listed in the vertical columns, there being two of these columns for each digit. The column marked "A" shows the potentials from top to bottom as the lever is moved to arrive at the finger stop; that marked "R" shows the succession of potentials from bottom to top as the lever leaves the finger stop. It will be understood that the first movement of the lever tells the register which group of five digits the particular digit is in and the return movement sends the counting pulses. The connection of the direct current bridge is indicated by "D. C."

TABLE I

*Polarity of S3 for digits 1 to 5*

| Digit position | 1 | | 2 | | 3 | | 4 | | 5 | |
|---|---|---|---|---|---|---|---|---|---|---|
| | A | R | A | R | A | R | A | R | A | R |
| 5 | | | | | | | | | D. C. | +/D. C. |
| 4 | | | | | | | D. C. | −/D. C. | D. C. | − |
| 3 | | | | | D. C. | +/D. C. | D. C. | + | D. C. | + |
| 2 | | | D. C. | −/D. C. | D. C. | − | D. C. | − | D. C. | − |
| 1 | D. C. | +/D. C. | D. C. | + | D. C. | + | D. C. | + | D. C. | + |
| Finger Stop | − | − | − | − | | | | | | |

TABLE II

*Polarity of S3 for digits 6 to 0*

| Digit position | 6 | | 7 | | 8 | | 9 | | 0 | |
|---|---|---|---|---|---|---|---|---|---|---|
| | A | R | A | R | A | R | A | R | A | R |
| 0 | | | | | | | | | D. C. | +/D. C. |
| 9 | | | | | | | D. C. | −/D. C. | D. C. | + |
| 8 | | | | | D. C. | +/D. C. | D. C. | − | D. C. | − |
| 7 | | | D. C. | −/D. C. | D. C. | − | D. C. | − | D. C. | − |
| 6 | D. C./+ | +/D. C. | D. C. | + | D. C. | + | D. C. | + | D. C. | + |
| Finger Stop | + | + | + | + | + | + | + | + | + | + |

The operating requirements for a lever type rectifier sender are:

*a.* When the lever for a short positive pulse (any digit 1 to 5, see Table I) is pulled to the finger stop, the direct current telephone circuit is cut out and the rectifier negatively polarized is introduced into the line circuit and remains in the circuit so polarized as long as the finger lever is held against the finger stop. When the lever is released, the rectifier polarity is reversed and this reversal continues as each additional finger position is passed until the finger lever reaches its home position, in which position the rectifier is again cut out and the direct current telephone bridge introduced.

*b.* When the lever for a long positive pulse (any digit 6 to 0, see Table II) is pulled to the finger stop, the D. C. telephone circuit is cut out and the rectifier positively polarized is introduced into the line circuit and remains in the circuit so polarized as long as the finger lever is held against the finger stop and until it has been released and has passed to the second position when the polarity of the rectifier is reversed. The reversals continue as each position is passed beyond the second position until the home position is reached, in which position the rectifier is again cut out and the direct current telephone bridge introduced.

GENERAL CIRCUIT OPERATION

The circuits of Figs. 5, 6 and 7, when Fig. 6 is placed below Fig. 5 and Fig. 7 below Fig. 6, show the register circuit connected to a calling subscriber line. When the subscriber calls, his line is connected to a register circuit through selector switches represented by the "box" 10 in Fig. 5 in the well known manner, as described in my prior patents. If the subscriber's station is equipped, as shown in Fig. 5, with a dial for open circuit pulsing, the special "class" potential PC is not connected to the register. If the subscriber's station is equipped with a rectifier sender (Figs. 8 and 9) for rectifier pulsing the class potential PC operates relay CR2 which adjusts the register for operation with the rectifier sender.

The register is provided with pulse receiving relays shown in Fig. 6 which respond to the pulses from the sub-station sender, and a group of pulse counting and storing relays for each digit of a number to be recorded. One such group of pulse counting and storing relays is shown in Fig. 7.

The pulse counting and storing relays hold the number and connect the proper selection potential PD corresponding to the stored digit to the selection control circuit of the register, which is not shown, to establish a desired connection. When the connection is established, the calling line is connected to the called line by the link circuits indicated by the box 10 of Fig. 5 if the line is free, or the calling party receives the busy tone if the line is unavailable and the register is released and restored to normal. The manner in which these operations are performed is shown and described in my prior patents and is not shown in the drawings as they form no part of the present invention.

DETAILED OPERATION OF CIRCUIT ON OPEN CIRCUIT PULSING

The pulse receiving circuit, Fig. 6 of the register normally places negative direct current on the pulsing circuit so that no change in the pulsing circuit is required when a line equipped with an open circuit dial calls.

When the subscriber's line is connected to the register, Fig. 6, PR1 and PR2 operate in multiple, in a circuit from ground, windings of PR1 and PR2 in parallel, back contacts of NBR in parallel, back DHR to battery. PR1 and PR2 make their front contacts and energize the register slow release relay DBR which does not fall off during dialling. The condensers C1 and C2 are disconnected and the rectifiers S1 and S2 short-circuited by NBR.

*Subscriber dials the digit 0*

The digit 0 is selected to indicate how the pulses for any digit from 1 to 0 are received and stored.

First pulse

When the subscriber releases the finger wheel of the dial, the line circuit is momentarily opened. PR1 and PR2 break their front contacts and make their back contacts. PR1 energizes OCR1 in a circuit from ground, back PR1, front DBR, back NBR, back OCR2, winding OCR1 to battery. Slow releasing changeover relay DDR is energized over both its windings through front contacts of DBR and back contacts of PR2 and PR1.

The circuit of the right front contact of OCR1 is normally open at front PCR1 and PCR3 (pulse counting relays, Fig. 7) so that no pulse counting relay is energized on the first pulse and positive potential PD1 remains connected to the register tube circuit (not shown) over back PCR1, 2, 3, 4 and 5 via conductor PD.

The reclosure of the line circuit by the dial terminates the first pulse and re-energizes PR1 and PR2 which break their back contacts and make their front contacts. When PR1 breaks its back contact, it removes the short circuit over front OCR1 from OCR2 so that OCR2 operates in series with OCR1 with circuit through front OCR1, back OCR2, winding OCR2, front DDR to ground. OCR2 operates and locks up to ground in a circuit from ground, front DDR, winding OCR2, front OCR2, back ECR2, resistor R to battery. The left hand contacts of relay OCR2 are of the make-before-break type. OCR2 disconnects itself from OCR1 which disconnects itself from the open back contact of OCR2 and releases.

During pulsing DBR does not fall off when PR1 and PR2 break their front contacts, and similarly, DDR does not fall off when PR1 and PR2 break their back contacts.

Second pulse

When PR1 makes its back contact at the beginning of the second pulse, it energizes ECR1 over front OCR2. ECR1 energizes pulse counting relay PCR1 in a circuit from ground, front ECR1, back PCR6, back PCR2, winding PCR1 to battery. PCR1 locks up to ground via front PCR1, back PCR2, 3 and 4, resistor R9, back PCR6 to ground. PCR1 transfers the PD-potential applied to the register tube circuit from PD1 to PD2.

At the end of the second pulse, the line circuit is reclosed for the second time and PR1 breaks its back contact and makes its front contact. The short circuit is removed from ECR2, which operates in series with ECR1 and then locks up in a circuit from battery, resistor R, front ECR2, winding ECR2, back OCR1 and front DDR to ground. The right hand contacts of relay ECR2 are of the make-before-break type. The operation of OCR2 releases ECR1 and OCR2. It will be noted that relays OCR1 and OCR2 operated in sequence during the first pulse and relays ECR1 and ECR2 operated in sequence during the second pulse. These relays continue to operate in the manner for succeeding pulses: OCR1 and OCR2 for odd pulses and ECR1 and ECR2 for even pulses.

Third pulse

When the dial opens the line circuit for the third time, PR1 energizes OCR1 as on the first pulse. OCR1 releases ECR2 and energizes PCR2 via front OCR1, back DCR2, back PCR5, front PCR1, winding PCR2 to battery. PCR2 locks up to ground over the same circuit which locked PCR1, releases PCR1 and places potential PD3 on the tube circuit.

Fourth and fifth pulses

The fourth and fifth pulses are received and stored in the same way as the second and third. On the fourth pulse, PCR3 operates via front PCR2, back PCR6, back DCR2, front ECR1 to ground, and locks up and places PD4 on the register tube circuit, at the same time releasing PCR2. On the fifth pulse, PCR4 operates over front PCR3, back PCR5, back DCR2, front OCR1, to ground, locks up, releases PCR3 and places PD5 on the tube circuit.

Sixth pulse

The sixth pulse energizes even counting relay ECR1 which energizes PCR6 in a circuit from ground, front ECR1, back DCR2, front PCR4, back PCR5, winding PCR6 to battery. PCR6 operates and opens the locking circuit of PCR4 which releases. PCR6 locks itself to the front contact of ECR1 over back PCR5.

At the end of the sixth pulse when PR1 breaks its back contact, ECR2 again locks up and releases OCR2 and ECR1. When ECR1 breaks its front contact, it removes short circuit from PCR5 which now locks up in series with PCR6 in a circuit from ground, front PCR6, winding PCR5, winding PCR6 to battery. These two relays remain locked up during the remaining four pulses. Relays PCR1 to PCR4 are all on their back contacts.

The X in the circuit between battery and the winding of relay PCR6 and also in other circuits is intended to indicate that additional contacts not pertinent to the invention are included for releasing the relay.

When PCR5 makes its front contact, it places potential PD6 over back PCR1, 2, 3 and 4 and front PCR5 on the tube circuit.

Seventh pulse

PCR5 reverses the connection between the front contacts of OCR1 and ECR1 and the pulse counting relays PCR1 to PCR4 so that when the seventh pulse is received and energizes OCR1, PCR1 is energized in a circuit from ground, front OCR1, back DCR2, front PCR5, back PCR2, winding PCR1, to battery. PCR1 locks up to ground via front PCR1, back PCR2, 3 and 4, resistor R9, front PCR5 to ground and places potential PD7 on the tube circuit.

Eighth pulse

The eighth pulse is received by ECR1 which energizes PCR2 in a circuit from ground, front ECR1, back DCR2, front PCR6, front PCR5, front PCR1, winding PCR2 to battery. PCR2 locks up to ground via front PCR5, releases PCR1 and places potential PD8 on the register tube circuit.

Ninth and tenth pulses

The ninth and tenth pulses are received by OCR1 and ECR1 respectively, which energize PCR3 and PCR4 respectively. The former releases PCR2 and places PD9 on the tube circuit; the latter releases PCR3 and placed PD0 on the tube circuit.

Table III is given for convenience in following the operation of the various relays involved in counting and storing pulses.

TABLE III

For open circuit pulsing

[*f* = front contact; *b* = back contact]

| Digit | PCR-Relay Energized | Operating Circuit | Potential |
|---|---|---|---|
| 1 | None | | PD1 |
| 2 | PCR1 | *f* ECR1, *b* PCR6, *b* PCR2 | PD2 |
| 3 | PCR2 | *f* OCR1, *b* PCR5, *f* PCR1 | PD3 |
| 4 | PCR3 | *f* ECR1, *b* PCR6, *f* PCR2 | PD4 |
| 5 | PCR4 | *f* OCR1, *b* PCR5, *f* PCR3 | PD5 |
| 6 | PCR5, 6 | *f* ECR1, *f* PCR4, *b* PCR5 | PD6 |
| 7 | PCR5, 6, 1 | *f* OCR1, *f* PCR5, *b* PCR2 | PD7 |
| 8 | PCR5, 6, 2 | *f* ECR1, *f* PCR6, *f* PCR5, *f* PCR1 | PD8 |
| 9 | PCR5, 6, 3 | *f* OCR1, *f* PCR5, *f* PCR2 | PD9 |
| 0 | PCR5, 6, 4 | *f* ECR1, *f* PCR6, *f* PCR5, *f* PCR3 | PD0 |

Digit counting relays operated

When DDR is energized at the start of the pulses of a digit, DCR1 is energized in a circuit from ground, front DDR, back DCR2, winding DCR1 to battery. DCR1 connects the winding of DCR2 to ground but DCR2 does not operate since it remains short-circuited in the well known manner over front DDR as long as DDR remains energized.

When the pulsing of a digit is finished, the line circuit remains closed and holds PR1 and PR2 operated long enough to release DDR. When DDR breaks its front contact, it releases the locked up odd and even counting relays and removes the short circuit from DCR2. DCR2 locks up in series with DCR1 and transfers the four connections from the first group of counting and storing relays PCR1 to PCR6, inclusive, to the next group of counting and storing relays, not shown. At the same time DCR2 places ground on conductor ST which energizes the selection control circuit (not shown), to cause the first and subsequent selection to take place as rapidly as the digits are dialled.

Digit stored

With DCR1 and DCR2 energized, the pulsing circuit is ready to receive, count and store the next digit. The pulse counting relay or relays energized remain locked up until the register is released.

DETAILED OPERATION OF CIRCUIT WITH RECTIFIER PULSING

A station equipped with a rectifier sender has the dial D replaced by the reversible rectifier S3 and the direct current bridge DB, as shown in Figs. 8 and 9. When a station equipped with such a rectifier sender calls, the line relay places a special PC potential on the T-terminal of the subscriber's line in a manner not shown, which operates relay CR2 in the register circuit of Fig. 6, to energize NBR and prepare the register circuit for receiving rectifier pulses. NBR does the following:

a. Locks up to ground over its front contact.

b. Shunts pulsing relays PR1 and PR2 by condensers C1 and C2 respectively to prevent them from chattering on alternating current.

c. Removes short circuit from rectifiers S1 and S2.

d. Disconnects the front contact of PR1 from the winding of DBR and in place thereof connects it to the winding of DJR.

e. Disconnects the odd and even counting relays from the back contact of PR1 and connects back PR1 directly to the pulse counting relays.

f. Places battery on the winding of DHR.

g. Connects armature of DJR to back PR1.

When the subscriber's station (Fig. 9) is connected to box 10 of Fig. 5, and thence to the pulse receiving relays (Fig. 6) PR1 operates in series with the closed line circuit and rectifier S1. PR2 does not operate because S2 is so polarized as to prevent the passing of negative current.

PR1 energizes slightly slow release relay DJR over front NBR and DJR energizes register slow release relay DBR.

As PR2 is not energized, a circuit is established when DBR closes its front contacts, from ground, back PR2, front DBR, one winding of DDR, resistor R5 to battery. DDR, as previously stated, is slightly slow releasing and provides holding grounds during pulsing.

The circuit remains in this condition until the subscriber pulls the lever of the sender to the finger stop and, as previously described, rectifier S3, positively or negatively polarized according to the digit called, is introduced into the line circuit.

Subscriber dials the digit 5

The digit 5 is selected to indicate how the pulses for any digit from 1 to 5 are received and stored. Table I shows the order, polarity and number of pulses.

When the finger lever is started towards the finger stop, the direct current bridge DB is connected and remains connected until the finger stop is reached, whereupon the rectifier S3, negatively polarized, is introduced into the line circuit (Fig. 8), as previously explained and as shown in Table I, and since negative battery is already connected, PR1 remains energized and no change takes place in the circuit as long as the finger lever is held against the finger stop.

When the finger lever is released, the polarity of rectifier S3 is immediately reversed and becomes positive (start of first pulse), as shown in Fig. 9 (also see Table I). PR1 releases and makes its back contact and in so doing energizes DHR in a circuit from ground, back PR1, front DBR, back DHR, winding DHR, front NBR to battery. DHR operates and does the following:

a. Locks up to ground through resistor R1 and front DDR.

b. Disconnects the pulsing relays from battery and in place thereof connects them to the alternating current source, indicated at A. C., through resistor R2.

c. Connects the pulse counting relays to back PR2. The right hand contacts of relay DHR are of the make-before-break type.

When alternating current is connected to the line, PR2 operates on the pulsating positive pulse in series with rectifiers S2 and S3. PR2 breaks its back contact very rapidly as it is a very sensitive relay, so that PCR1 is not prematurely energized and potential PD1 remains connected to conductor PD.

At the end of this short positive pulse and at the beginning of a negative pulse (second), PR1 breaks it back contact and PR2 makes its back contact, thus energizing pulse counting relay PCR1 in a circuit from ground, back PR2, front DBR, front DHR, back DFR, back DCR2, back PCR6, back PCR2, winding PCR1 to battery. PCR1 locks up to ground through resistor R9 (see Table IV) and connects PD2 to conductor PD.

At the beginning of the third pulse, PR1 makes its back contact and energizes PCR2 to connect PD3 to conductor PD. PR2 breaks its back contact.

At the beginning of the fourth pulse, PR2 makes its back contact and energizes PCR3 to connect PD4 to conductor PD. PR1 makes its front contact.

At the beginning of the fifth and positive pulse, PR1 makes its back contact and energizes PCR4 to place potential PD5 on conductor PD. PR2 makes its front contact but does not break it again as S3 is replaced by the bridge DB in the home position (see Table I).

During the rapid opening and closure of the front contact of PR1, DJR does not release.

Table IV is given for convenience in following the operation of the various relays involved in counting and storing pulses.

TABLE IV
*For rectifier pulsing*

| Digit | PCR-Relay Energized | Operating Circuit | Potential |
|---|---|---|---|
| 1 | None | | PD1 |
| 2 | PCR1 | b PR2, b PCR6, b PCR2 | PD2 |
| 3 | PCR2 | b PR1, b PCR5, f PCR1 | PD3 |
| 4 | PCR3 | b PR2, b PCR6, f PCR2 | PD4 |
| 5 | PCR4 | b PR1, b PCR5, f PCR3 | PD5 |
| 6 | PCR5, 6 | b DJR, f DBR, f DFR | PD6 |
| 7 | PCR5, 6, 1 | b PR2, f PCR5, b PCR2 | PD7 |
| 8 | PCR5, 6, 2 | b PR1, f PCR6, f PCR5, f PCR1 | PD8 |
| 9 | PCR5, 6, 3 | b PR2, f PCR5, f PCR2 | PD9 |
| 0 | PCR5, 6, 4 | b PR1, f PCR6, f PCR5, f PCR3 | PD0 |

*Digit counting relay DCR2 operated*

At the end of pulsing, the line circuit is again closed through the telephone circuit without rectifier S3. Thus both PR1 and PR2 remain on their front contacts long enough to release DDR. When DDR breaks its front contacts, it removes short circuit from DCR2 which operates and transfers the leads from the pulsing relays to the next set of pulse counting relays and unlocks DHR.

*Subscriber dials digit 0*

This digit is selected to indicate how the pulses for any digit from 6 to 0 are received and stored (also see Tables II and IV).

When the finger lever is pulled toward the finger stop, the bridge DB remains until the beginning of the first position when rectifier S3, positively polarized, is introduced into the line circuit, as shown in Fig. 9, and as previously explained and as shown in Table II. Since negative direct current is connected to the line at this moment, both PR1 and PR2, release and make their back contacts. PR1 energizes DHR, as previously explained, which connects alternating current to the line, whereupon PR2 breaks its back contact and makes its front contact to hold DBR. PR2 breaks its back contact with sufficient rapidity to prevent a premature operation of PCR1.

As the rectifier S3, positively polarized, is introduced into the line circuit when the finger lever is within less than one position of the finger stop and remains in the line circuit as long as the finger holds the lever and until it has been released and returned one position (see Table II), the front contact of PR1 remains open. This time interval is long enough to allow DJR to make its back contact which does two things:

a. It energizes DFR in a circuit from ground, back PR1, front NBR, back DJR, front DBR, back DFR, winding DFR to battery. DFR locks up via front DDR and its own front contact.

b. After DFR makes its front contacts, a circuit is established from ground, back PR1, front NBR, back DJR, front DBR, front DFR, back DCR2, winding PCR6 to battery. PCR6 connects PCR5 but as long as PR1 remains on its back contact it is short-circuited and therefore does not operate.

DFR reverses the connections between the back contacts of PR1 and PR2 and the operating leads to the pulse counting relays but as PCR6 is energized, PCR1 is not energized. The finger lever may be held indefinitely against the finger stop without change in the circuit condition. However, when the finger lever is released and moves into the second position (beginning of second pulse) on return and rectifier S3 becomes negatively polarized as indicated in Fig. 8 (also see Table II), PR1 operates and breaks its back contact which removes short circuit from PCR5 which now locks up in series with PCR6 and a circuit is established from ground, back PR2, front DBR, front DHR, front DFR, back DCR2, front PCR5, back PCR2, winding PCR1 to battery. PCR1 locks up in the usual way and connects PD7 to conductor PD. When PR1 makes its front contact, DJR is again energized and remains on its front contact during the remainder of pulsing.

When PR1 makes its back contact for the second time, PCR2 is energized; when PR2 makes its back contact for the second time, PCR3 is energized; and when PR1 makes its back contact for the third time, PCR4 is energized and places PD0 on the lead to the register, all as shown in Tables II and IV.

*Digit counting relay DCR2 operated*

At the end of the fifth pulse, the line circuit is again closed and DDR releases as previously described, after which DCR2 operates. DDR releases DFR and DHR. DCR2 transfers the leads from the pulsing relays to the next set of pulse counting relays, not shown.

While I have described above the principles of my invention in connection with specific apparatus, it is to be clearly understood that this description is made only by way of example and not as a limitation to the scope of my invention.

What is claimed is:

1. In an automatic telephone system comprising a plurality of lines, a plurality of subscribers' stations, sender means at a first of said stations for sending direct current pulses of a single polarity over said lines corresponding to numerical digits, rectifier-sender means at a second of said stations for sending pulses of different polarities over said lines corresponding to numerical digits, register means adapted to be selectively coupled over said lines to either of said stations, said register means including separate means responsive to each type of pulse sent from said stations, said separate means comprising: a pair of pulsing relays, a pair of oppositely polarized unidirectional devices, each adapted to be serially connected to a different one of said pulsing relays, a first switch means operated when said second station is coupled to said register, additional relay means under control of said switch means, said additional means including a contact for controlling the connection of said uni-directional devices to said pulsing relays; a plurality of pulse counting relays connected in a chain and under control of said pulsing relays, said counting relays adapted to count the pulses received over said line from either of said stations, and to store said pulses for future transmission.

2. An automatic telephone system as claimed in claim 1, wherein said register means further comprises a first source of uni-directional current, a second source of alternating current, a second switch means connectable between said sources and said uni-directional devices, said second switch means under control of said additional relay means and adapted to disconnect said first current source from said pulsing relays and to connect said second current source to said pulsing relays through said uni-directional devices upon operation of said additional relay means.

3. An automatic telephone system as claimed in claim 2, further comprising a line circuit interconnecting said second station and said register means, the rectifier of said sender means at said second station being connected to said line circuit when said sender is set to a sending position to indicate by its polarity which polarity of current from said second source is to be allowed to pass over said line.

GERALD DEAKIN.

References Cited in the file of this patent

UNITED STATES PATENTS

| Number | Name | Date |
| --- | --- | --- |
| 1,886,216 | Nilsson | Nov. 1, 1932 |
| 2,272,464 | Hensler | Feb. 10, 1942 |
| 2,308,637 | Babcock | Jan. 19, 1943 |
| 2,406,001 | Deakin | Aug. 20, 1946 |
| 2,433,347 | Deakin | Dec. 30, 1947 |